(12) United States Patent
Ramboz et al.

(10) Patent No.: US 10,523,990 B2
(45) Date of Patent: Dec. 31, 2019

(54) REUSABLE DIGITAL SIGNAGE ACROSS MULTIPLE LOCATIONS WITH LOCAL VARIANCES

(71) Applicant: Adobe Inc., San Jose, CA (US)

(72) Inventors: Julien Ramboz, Leymen (FR); Damien M. Antipa, Basel (CH); Alexandre Capt, Landser (FR)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/986,514

(22) Filed: May 22, 2018

(65) Prior Publication Data

US 2019/0364321 A1 Nov. 28, 2019

(51) Int. Cl.
 *H04N 21/262* (2011.01)
 *H04N 21/266* (2011.01)
 *H04N 21/414* (2011.01)

(52) U.S. Cl.
 CPC ..... *H04N 21/26283* (2013.01); *H04N 21/266* (2013.01); *H04N 21/26275* (2013.01); *H04N 21/41415* (2013.01)

(58) Field of Classification Search
 CPC ....... H04N 21/26283; H04N 21/26275; H04N 21/266; H04N 21/41415
 See application file for complete search history.

(56) References Cited

U.S. PATENT DOCUMENTS

| | | | | |
|---|---|---|---|---|
| 2009/0106082 | A1* | 4/2009 | Senti ................. | G06Q 30/0204 705/7.33 |
| 2009/0144157 | A1* | 6/2009 | Saracino ................ | G06Q 30/02 705/14.73 |
| 2009/0300028 | A1* | 12/2009 | Ben Natan .............. | G06F 16/00 |
| 2010/0118200 | A1* | 5/2010 | Gelman ............ | H04N 21/2402 348/578 |
| 2013/0151656 | A1* | 6/2013 | Bourret .............. | G06Q 30/0252 709/217 |
| 2013/0339156 | A1* | 12/2013 | Sanjay .................. | G06Q 30/02 705/14.66 |
| 2014/0331243 | A1* | 11/2014 | Villoria ........... | H04N 21/44204 725/14 |

(Continued)

*Primary Examiner* — Randy A Flynn
(74) *Attorney, Agent, or Firm* — Brake Hughes Bellermann LLP

(57) ABSTRACT

Systems and techniques for creating reusable digital signage at a central computing device and deploying the reusable digital signage from the central computing device to multiple remote display devices include creating a first channel and a second channel at a central computing device. A first set of multiple digital assets are assigned to the first channel and a second set of multiple digital assets are assigned to the second channel. A schedule for display of the first channel and the second channel is created, where the schedule includes timing information for display of the first channel and for display of the second channel. The schedule is assigned to the multiple remote display devices. A single file of the first channel and the second channel is generated for deployment to the multiple remote display devices including the schedule as metadata in the single file. The single file is communicated from the central computing device to the multiple remote display devices for display of the first channel and the second channel according to the schedule.

20 Claims, 18 Drawing Sheets

(56) References Cited

U.S. PATENT DOCUMENTS

| | | | |
|---|---|---|---|
| 2015/0112810 A1* | 4/2015 | Kim | G06Q 30/0269 705/14.61 |
| 2015/0169581 A1* | 6/2015 | Pusateri | G06F 16/35 707/737 |
| 2015/0378570 A1* | 12/2015 | Madgwick | G06F 16/4387 715/716 |
| 2018/0260784 A1* | 9/2018 | Lee | G06Q 10/1093 |

* cited by examiner

300

Receive a single file at a remote display device from a central computing device, where the single file includes a first channel and a second channel and a schedule
302

Extract from the single file the first channel containing a first set of multiple digital assets, the second channel containing a second set of multiple digital assets and the schedule, where the schedule includes timing information for display of the first channel and for display of the second channel
304

Display the first channel and the second channel on the remote display device according to the schedule
306

Single Screen Display

Display Information

Single screen display
Demo location of a single screen display

Properties
Current channel  Auto ✎
Resolution  2560 x 1440
Last modified  9 hours ago

570

Schedules  + Add schedule

| Playlist | Priority | Schedule |
|---|---|---|
| Yearly schedule | | |
| ○ Channel A | 1 | After 6 AM and before 12 AM |
| ○ Channel B | 1 | After 12 AM and before 6PM |
| Special event schedule | | |
| ▦ Channel C | 2 | 2017-01-27−2017-02-02 after 6AM and before 12PM |
| ▨ Channel D | 2 | 2017-01-27−2017-02-02 after 12PM and before 6PM |

< Mon Jan 30 2017 >   Daily | Weekly 1 2 3 4 5 6 7 8 9 10 11 12PM 1 2 3 4 5 6 7 8 9 10 11

560

580

Devices

| | Title | DeviceID | Make/Model | Resolution | Version |
|---|---|---|---|---|---|
| ☐ | | | | | |
| ◉ | Device 1 | (unassigned) | ABC | 2560 x 1140 | N/A |
| ◉ | Device 2 | (unassigned) | DEF | 2560 x 1140 | N/A |
| ◉ | Device 3 | (unassigned) | GHI | 2560 x 1140 | N/A | close

Global Schedule ⌄    Close

Schedule Information

Global Schedule

Properties

Last Modified: [Now]

Assigned Channels    + Assign Channel

| ☐ Channel | Role | Priority | Schedule |
|---|---|---|---|
| B5 (2007) | b5 | 1 | Before 12:00 |
| A5 (2015) | a5 | 1 | After 12:00pm |

Assigned Displays

Display    Resolution

There is no item

FIG. 14

Global Schedule ∨

Display Information

Entrance

Properties    Current Channel / Resolution    Now

Last Modified:

Assigned Channels & Schedules

| ☐ | Channel | Role | Priority | Schedule |
|---|---------|------|----------|----------|
| | B5 (2007) | b5 | 1 | Before 12:00 |
| | A5 (2015) | a5 | 1 | After 12:00pm |

Devices

Display    Resolution

There is no item

Global Schedule ⌄

Schedule Information

Global Schedule

ⓘ Properties

Properties
Last Modified: [Now]

Assigned Displays

| Display | Resolution |
|---|---|
| Entrance | 1920 x 1080 |
| Entrance | 1920 x 1080 |

Assigned Channels

+ Assign Channel

| ☐ Channel | Role | Priority | Schedule |
|---|---|---|---|
| B5 (2007) | b5 | 1 | Before 12:00 |
| A5 (2015) | a5 | 1 | After 12:00pm |

Close

Display Information

Entrance ⌄

Entrance
Properties
- Current Channel: auto
- Resolution: 1920 x 1080
- Last Modified: 16 minutes ago

Assigned Channels

| Channel | Role | Priority | Schedule |
|---|---|---|---|
| Open House | lunch | 2 | After 11:00 and before 2:00pm |
| Global Schedule | | | |
| B5 (2007) | b5 | 1 | Before 12:00 |
| A5 (2015) | a5 | 1 | After 12:00pm |

Devices

| Title | DeviceId | Make/Model | Resolution | Version |
|---|---|---|---|---|

There is no Item

REUSABLE DIGITAL SIGNAGE ACROSS MULTIPLE LOCATIONS WITH LOCAL VARIANCES

TECHNICAL FIELD

This description relates to systems and techniques for a reusable digital signage across multiple locations with local variances.

BACKGROUND

Electronic content may be displayed in various locations on different display devices that function as digital signage. For example, different display devices may be located throughout a store, a car dealership showroom, a shopping mall, in storefront windows, among other locations. The display devices may be intended to display electronic content so that the display devices function as digital signage. In some instances, it is desirable to display the same electronic content across multiple display devices.

For instance, a car dealership may own multiple different showrooms in different locations with display devices in each location. The car dealership may desire to display the same electronic content on each of the display devices in all of the showrooms, even in different locations. The total number of display devices may number in the hundreds or even the thousands and the locations may be spread across an entire country or even span across multiple countries. Additionally, the car dealership may desire to display the same content at specific times across the multiple locations.

In a further complication of the problem, 80-90 percent of the electronic content may be the same for each display device; however, 10-20 percent of the electronic content may not be the same for each display device and may be region or location-specific content. It may be desirable to define the common content to be shown on all the display devices, and only specify the local exceptions as needed.

Traditionally, each individual element (or individual digital assets) of the electronic content (e.g., picture, image, video, etc.) is individually scheduled to appear on specific display devices at specific times. One technical problem is that this approach of individually scheduling each individual element of the content to appear on specific display devices at specific times does not scale well when there are hundreds or thousands of elements and hundreds or thousands of display devices. For this approach, an n-to-m mapping is needed where n is the number of elements and m is the number of display devices. For example, assuming there are 50 elements to show on 100 display devices, then 5000 individual assignments need to be performed in order to schedule all 50 elements across all 100 display devices.

One specific approach to individually scheduling each individual element of the content for each display is to tag each element with a tag matching the specific display device and then to add timing information to properly schedule the element so that the element is displayed at the desired time. In addition to being a cumbersome and manually intensive process, this specific approach does not scale well, as mentioned above. Furthermore, in this specific approach it is hard to specify and maintain an order for the elements. Also, because the order may be resolved at runtime, it is difficult to know with certainty that the assets will actually play as desired.

A further issue with this specific approach is that each assignment is unique and is not re-usable. If a number of individual elements are scheduled to form the electronic content or an experience, then the experience is not easily duplicated to share on a new set of display devices. To share the electronic content on a new set of display devices, the elements have to be assigned one by one again to each new display device.

SUMMARY

According to one general aspect, systems and techniques for creating reusable digital signage at a central computing device and deploying the reusable digital signage from the central computing device to multiple remote display devices include creating a first channel and a second channel at a central computing device. A first set of multiple digital assets are assigned to the first channel and a second set of multiple digital assets are assigned to the second channel. A schedule for display of the first channel and the second channel is created, where the schedule includes timing information for display of the first channel and for display of the second channel. The schedule is assigned to the multiple remote display devices. A single file of the first channel and the second channel is generated for deployment to the multiple remote display devices including the schedule as metadata in the single file. The single file is communicated from the central computing device to the multiple remote display devices for display of the first channel and the second channel according to the schedule.

In another general aspect, systems and techniques for receiving and displaying reusable digital signage at a remote display device include receiving a single file at a remote display device from a central computing device, where the single file includes a first channel and a second channel and a schedule. The first channel containing a first set of multiple digital assets, the second channel containing a second set of multiple digital assets and the schedule are extracted from the single file. The schedule includes timing information for display of the first channel and for display of the second channel. The first channel and the second channel are displayed on the remote display device according to the schedule.

In another general aspect, a system for creating reusable digital signage at a central computing device and deploying the reusable digital signage from the central computing device to multiple remote display devices includes at least one memory including instructions and at least one processor that is operably coupled to the at least one memory and that is arranged and configured to execute instructions that, when executed, cause the at least one processor to implement an application having a user interface. The application includes a creation module that is configured to create a first channel and a second channel using the user interface, assign a first set of multiple digital assets to the first channel using the user interface and assign a second set of multiple digital assets to the second channel using the user interface. The creation module is configured to create a schedule using the user interface for display of the first channel and the second channel, where the schedule includes timing information for display of the first channel and for display of the second channel, and assign the schedule using the user interface to the multiple remote display devices. The application includes a deployment module that is configured to generate a single file of the first channel and the second channel for deployment to the multiple remote display devices including the schedule as metadata in the single file and communicate the single file from the central computing device to the multiple remote display devices for display of the first channel and the second channel according to the schedule.

The details of one or more implementations are set forth in the accompanying drawings and the description below. Other features will be apparent from the description and drawings, and from the claims.

BRIEF DESCRIPTION OF THE DRAWINGS

FIG. 3 is a flowchart illustrating example operations of one remote display device from the system of FIG. 1.

FIG. 5 is an example screenshot of a timeline on the user interface for a single day.

FIG. 12 is an example screen shot of the user interface from the system of FIG. 1.

FIG. 14 is an example screen shot of the user interface from the system of FIG. 1.

FIG. 15 is an example screen shot of the user interface from the system of FIG. 1.

FIG. 18 is an example screen shot of the user interface from the system of FIG. 1.

DETAILED DESCRIPTION

Figure 1:
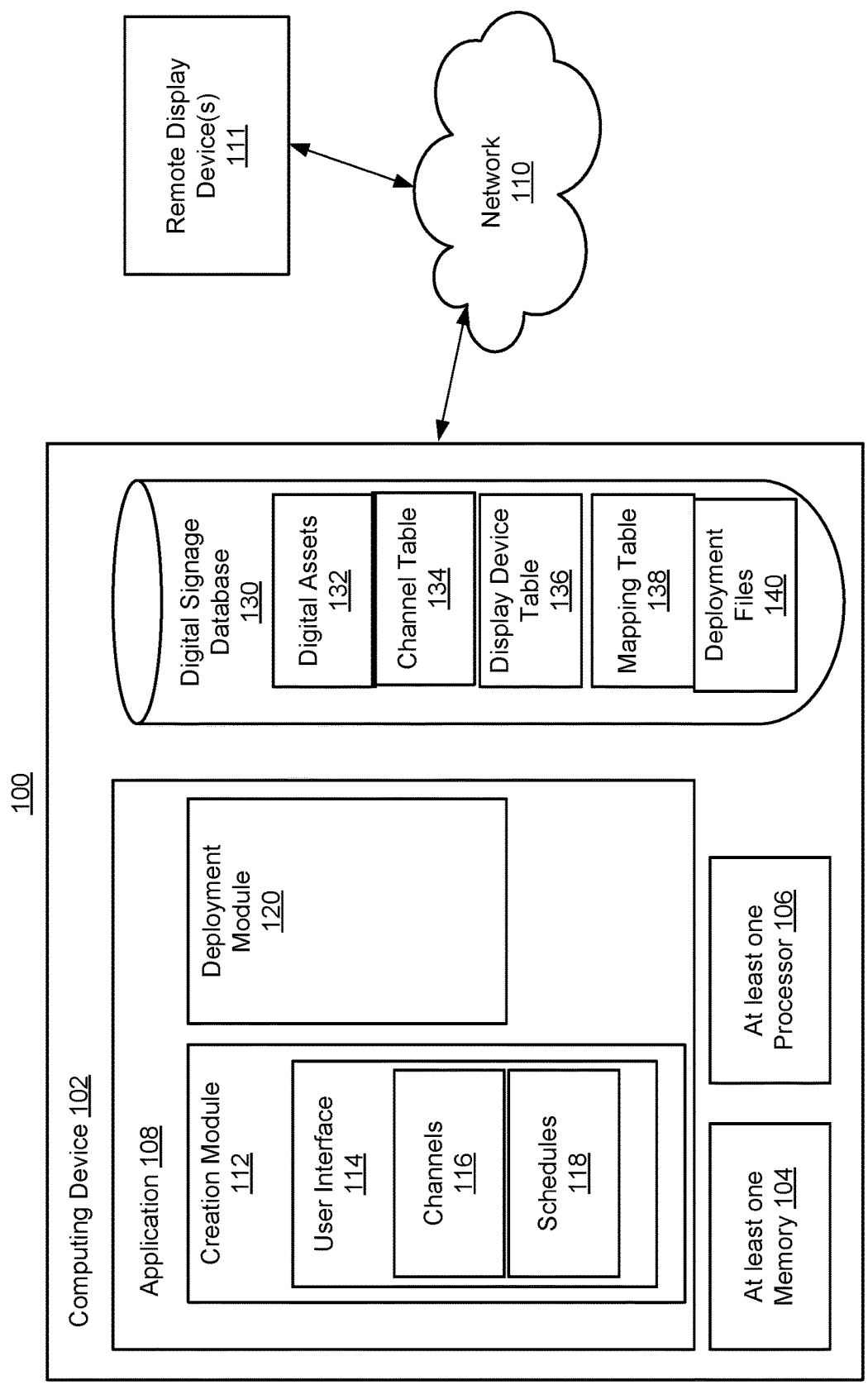
FIG. 1 is a block diagram of a system for creating reusable digital signage at a central computing device and deploying the reusable digital signage from the central computing device to multiple remote display devices.

This document describes systems and techniques for creating reusable digital signage at a central computing device and deploying the reusable digital signage to multiple remote display devices. The systems and techniques provide a technical solution to the technical problems described above. For example, the systems and techniques enable multiple individual elements of the electronic content (e.g., picture, image, video, etc.) to be grouped into reusable channels (or experiences) that can be deployed and scheduled to run on multiple display devices in multiple different locations.

Grouping the individual elements into channels, which are reusable, significantly reduces the n-to-m mapping problem described above when having to assign each individual element to each display device. The mapping problem becomes an n-to-k and then k-to-m mapping, where n is the number of individual elements, k is the number of channels and m is the number of display devices. Given the same numbers as above, the 50 individual elements can be mapped to a single channel, k, which is then assigned to 100 different display devices, assuming the same content is displayed on all of the display devices. In this manner, only 150 assignments need to be made instead of 5000 assignments, thus greatly increasing the speed of creating and deploying the electronic content across display devices in multiple different locations. Additionally, the created channels are reusable and easily re-assignable to new display devices. This results in direct, technical improvements to the creation and delivery of digital content from a central location to multiple different remote display devices in various locations, including Furthermore, not only are the individual elements grouped into a channel, but multiple channels may be grouped into a single file along with the scheduling information for each of the channels and communicated (or deployed) as a single unit to each of the designated display devices. Again, this greatly increases the speed of creating and deploying multiple channels along with a schedule for displaying the channels to multiple different display devices. Also, the single file is re-usable and may be deployed to other display devices.

Additionally, local or regional channels may be created that contain individual elements that are to be shown only on certain display devices. The local or regional channels may override the scheduling for other global channels. The system and techniques provide a solution for creating and deploying a file for a local channel that includes individual elements, scheduling information and priority information. The file for the local channel may be deployed to remote display devices and the remote display devices automatically display the local channel content according to the schedule and priority information for the local channel in combination with the schedule and any priority information for other channels. In this manner, the scheduling of grouping of individual elements into channel, enables the creation of both global channels and local channels from the central computing device that allow for local overrides to the global schedules so that exceptions and variations to the global schedule are easily managed.

The systems and techniques described in this document eliminate the need to annotate each individual element (e.g., using tags) with location and scheduling information to properly orchestrate the content on remote display devices. A new user interface enables the easy creation, scheduling, assignment and deployment of channels to the remote display devices from a central computing device hosting the user interface. The user interface eliminates previous interfaces that had included long lists of individual element assignments to individual display devices and makes it easier, faster and more user friendly to construct channels of individual elements for deployment on a global scale along with having local overrides. The grouping of individual elements into channels makes it easier to manage experiences as a whole set. The grouping of channels into reusable schedules (or files containing schedules as metadata) makes it easier to manage global reusable experiences without having to redefine all the various meta information for each element, where the meta information may include timing information and priority information.

As used herein, digital signage refers to electronic content made up of multiple digital assets that are displayed on a display device according to a schedule for the display of the electronic content. For example, digital signage includes electronic content displayed on display devices located in various commercial or retail settings that is displayed according to a schedule. Digital signage is a sub-segment of signage. Digital signs use technologies such as LCD, LED and Projection to display electronic content such as digital images, video, streaming media, and information. Digital signs can be found in public spaces, transportation systems, museums, stadiums, retail stores, hotels, restaurants, and corporate buildings etc., to provide wayfinding, exhibitions, marketing and outdoor advertising as well as many other purposes.

As used herein, a digital asset refers to any type of individual element of digital content including, but not limited to, an image, a video, a picture, an audio snippet, a graphic, a logo, a presentation slide, etc.

As used herein, a channel refers to an organized grouping of multiple digital assets for display as digital signage on a display device. A channel represents an individual experience to be shown as digital signage on a display device. Multiple channels can be assigned to a display device, where timing information, priority information and other information determines which channel is shown on the display device at any point in time.

FIG. 1 is a block diagram of a system 100 for creating reusable digital signage at a central computing device and deploying the reusable signage from the central computing device to multiple remote display devices. The system 100 includes a computing device 102 having at least one memory 104, at least one processor 106 and at least one application 108. In this document, the computing device 102 may be referred to interchangeably as a central computing device. The computing device 102 may communicate with one or more other remote display devices 111 over a network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects or files generated by the application 108 and its components.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network where a user accesses the application 108 from another computing device over a network, such as the network 110. In one implementation, the application 108 may be a digital asset management application that enables users to create reusable digital signage at a central computing device and deploy the reusable digital signage from the central computing device to multiple remote display devices, such as remote display devices 111. The digital asset management application may be a standalone application that runs on the computing device 102. Alternatively, the digital asset management application may be an application that runs in another application such as a browser application or be a part of a suite of applications running in a cloud environment.

At a general level, the application 108 includes a creation module 112. The creation module 112 includes a user interface 114 that enables a user to create reusable digital signage by creating one or more channels 116 from individual digital assets and creating one or more schedules 118 for each of the channels 116. The application 108 also includes a deployment module 120 that generates a file of channels, along with the schedules, to deploy to remote display devices 111 and that communicates the file from the computing device 102 to the remote display devices 111 over the network 110.

As discussed above, digital signage refers to electronic content made up of multiple digital assets that are displayed on a display device according to a schedule for the display of the electronic content. For example, digital signage includes electronic content displayed on display devices located in various commercial or retail settings that is displayed according to a schedule. Digital signage is a sub-segment of signage. Digital signs use technologies such as LCD, LED and Projection to display electronic content such as digital images, video, streaming media, and information. Digital signs can be found in public spaces, transportation systems, museums, stadiums, retail stores, hotels, restaurants, and corporate buildings etc., to provide wayfinding, exhibitions, marketing and outdoor advertising as well as many other purposes.

The creation module 112 employs the user interface 114 to enable a user to create one or more channels 116 containing digital assets. As discussed above, a digital asset refers to any type of individual element of digital content including, but not limited to, an image, a video, a picture, an audio snippet, a graphic, a logo, a presentation slide, etc. As discussed above, a channel 116 refers to an organized grouping of multiple digital assets for display as digital signage on a display device. A channel represents an individual experience to be shown as digital signage on a display device. Multiple channels can be assigned to a display device, where timing information, priority information and other information determines which channel is shown on the display device at any point in time.

The creation module 112 is configured to create a channel 116 using the user interface 114. The creation module 112 is configured to assign multiple digital assets to the channel 116 using the user interface 114. An example implementation of the user interface 114 is illustrated in FIGS. 5-18, which is described in more detail below. The creation module 112, through the user interface 114 or otherwise, enables the user to assign individual digital assets to a channel 116. The digital assets may be located and stored on the computing device 102, such as in memory 104, or may be located and stored on other computing devices (not shown) and retrieved from the other computing devices through the network 110. In this manner, a channel is populated with multiple digital assets, which may include any combination of videos, images, pictures, etc. In some implementations, the channel includes the digital assets in an order in which the digital assets are to be displayed, such that the channel always shows the digital assets in a same strict order. In some implementations, the channels may be created to display the assigned digital assets in a more flexible order such as a random order.

In one implementation, the computing device 102 also includes a digital signage database 130. The digital signage database 130 may include digital assets 132, a channel table 134, a display device table 136, a mapping table 138 and deployment files 140. The components of the application 108 interact with the digital signage database 130 as part of the creation and deployment of the reusable digital signage. In other implementations, the digital signage database 130 may be located on a different computing device and the application 108 and the digital signage database 130 may function in the same manner described herein, but the assets, tables and files may be located on a different computing device.

The creation module 112 creates a channel and displays the channel on the user interface 114 so the user can visually see the created channel. The user interface 114 enables the user to create the channel and to assign digital assets to the channel. The user interface 114 enables the assignment of digital assets to the channel in a variety of ways includes dragging and dropping digital assets to a channel displayed on the user interface so the user can visually view the specific digital assets being assigned to the channel. In this manner, when a channel that has been populated with digital assets is displayed on the user interface 114, the user can see the specific digital assets assigned to the channel. The user interface 114 enables the user to modify a channel by modifying the digital assets assigned to the channel, including removing digital assets, replacing digital assets with other digital assets, adding new digital assets, and other manipulations of the channel.

When the creation module 112 creates a channel 116 and digital assets 132 are assigned to the channel 116, then a corresponding channel table 134 is created that lists the digital assets 132 assigned to that particular channel. The channel table 134 may use pointers or other means to point to the specific digital assets that have been assigned to the channel. In this manner, the creation module 112 tracks digital assets 132 assigned to a specific channel 116 through the channel table 134. Changes made to the channel through the user interface 114 also cause corresponding changes to be made to the respective channel table 134.

The creation module 112 enables a user to create multiple different channels 116 and assign digital assets 132 to each of the different channels 116 using the user interface 114. Each channel and the digital assets assigned to the channel is tracked with a separate channel table 134.

The creation module 112 is configured to create a schedule 118 for each of the channels 116 using the user interface 114 for display of the channels 116. The schedule 118 includes timing information for when the channel is to be displayed. For example, the timing information may include periods of time such as times during the day, days of the week, weeks of the year, and days of the year, as well as any other timing information related to the display of the channel.

In addition to timing information, each schedule 118 may include priority information. The priority information may include a priority scheme to enable a user to designate a priority for display of one channel instead of other channels that may be scheduled to display at the same time. The priority information is used by the remote display devices 111 to resolve scheduling conflicts between multiple channels that may be scheduled for display during the same time. In that situation, the priority information takes precedence over the conflicting timing information between channels.

In some implementations, the priority information may use a numerical ranking scheme where a higher number is used to designate a higher priority for the channel. For instance, a channel with a priority of two (2) would be displayed over a channel with a priority of one (1) in the event that the timing information for each channel creates a conflict where each channel is scheduled to be displayed during the same time. Likewise, another channel with a priority of three (3) would be displayed over both the channel with the priority of two (2) and the channel with the priority of one (1) in the event of a scheduling conflict. The priority information would override the timing information in the event of a timing conflict. It is understood that this is just one example of a priority scheme and that other priority schemes are contemplated where designations other than a numerical value may be used to indicate the priority of one channel over another channel or channels.

The user interface 114 enables the user to view the schedule including the timing information and the priority information. For instance, the user interface 114 may include a timeline preview of the channel schedules in the form of a timeline with identifiers (e.g., color coding) for each channel to enable a user to have a quick glance or overview of the schedule running at a specific time, such as on a specific day or week. Example illustrations of a timeline are provided in FIGS. 5 and 6, as discussed below in more detail.

In some implementations, the timing information and the priority information may be tracked in the channel table 134 as metadata. That is, the timing information and the priority information may be included as part of the channel table 134 as metadata that is configured to convey to the remote display devices 111 all of the information needed to display the channel on a display device.

Following the creation of the channels and the creation of the schedules for each channel, the creation module 112 is configured to assign the schedule 118 to remote display devices 111 through the user interface 114. The digital signage database 130 may include a display device table 136 that lists all of the remote display devices 111, including the location of each of the remote display devices 111. The information from the display device table 136 may be viewed through the user interface 114. The user interface 114 enables the created channels and schedules to be assigned to specific display devices.

The digital signage database 130 also includes a mapping table 138. The mapping table 138 creates a mapping between the channel table 134 and the display device table 136 when a schedule for a channel is assigned to a particular remote display device. The mapping table 138 may provide mapping information to the user interface 114 for viewing and manipulation of the assigned schedules to the remote display devices. Changes made through the user interface 114 to the schedule assignments are updated and reflected in the mapping table 138.

For example, the creation module 112 may create a first channel and a second channel and assign multiple digital assets to each of the channels using the user interface 114. The creation module 112 may create a schedule for display of the first channel and the second channel using the user interface 114, where the schedule includes timing information for display of the first channel and for display of the second channel. The schedule may be assigned to multiple remote display devices 111 using the user interface 114.

During these steps, corresponding entries may be created in the channel table 134 and the mapping table 138.

The deployment module 120 is configured generate a single file of the channel or channels for deployment to the remote display devices 111, including the schedule as metadata in the single file. The single file created by the deployment module 120 also may be referred to as a deployment file 140. For example, if there is a single channel and a schedule for displaying the single channel on multiple remote display devices, the deployment module 120 creates a single deployment file 140 with the schedule as metadata to the file. The single deployment file 140 may include all of the digital assets, channel information and schedule information for the deployment of the single file to the assigned remote display devices 111.

In another example, if there are multiple channels and schedules for displaying the channels on multiple remote display devices 111, the deployment module creates a single deployment file 140 with the schedule as metadata to the file. The single deployment file 140 may include all of the digital assets, channel information and schedule information for the deployment of the multiple channels to the assigned remote display devices 111.

In some implementations, the deployment file 140 uses a compressed file format to package all of the digital assets, channel information and schedule information into the single file. For instance, in one example, the compressed file format may be a zip format. It is understood that other compressed file formats may be used to compress the deployment file 140.

Following creation of the deployment file 140, the deployment module 120 is configured to communicate the deployment file 140 to the multiple remote display devices 111 for display of the channels according to the schedule. The deployment module 120 may use one of a number of various communication protocols to communicate the deployment file 140 to the remote display devices 111 over the network 110. In some implementations, the deployment module 120 uses the information in the display device table 136 and the mapping table 138 to communicate deployment file 140 to the assigned remote display devices 111.

In some implementations, a remote display device 111 may query or ping the computing device 102 to determine if there are any new deployment files for download to the display device. Responsive to receiving the query for a new deployment file, the deployment module 120 communicates the deployment file 140 to the requesting remote display device 111.

After a deployment file 140 has been communicated to the remote display device 111, the remote display device 111 receives the file and extracts the contents of the received file. While not illustrated in FIG. 1, each of the remote display devices 111 may include at least one memory and at least one processor that function in a manner similar to that described for the at least one memory 104 and the at least one processor 106 of the computing device 102. The remote display device 111 then displays the assigned channels, including the sequences of digital assets for each assigned channel.

As noted above, it may be desirable or necessary to have local channel assignments or regional channel assignments for one or more of the remote display devices 111. The user interface 114 of the creation module 112 may be used to create a local channel, assign multiple digital assets to the local channel and create a schedule for when to display the local channel. The user interface 114 of the creation module 112 may be used to assign the local channel and the corresponding schedule to one or more of the remote display devices 111 for display of the local channel according to the schedule. The schedule may include timing information and priority information.

The deployment module 120 is configured to create a deployment file 140 for the local channel and to communicate the deployment file 140 to the assigned remote display devices 111. The local channel may be communicated as part of another deployment file that also includes other channels and schedule information for the remote display device or it may be communicated as its own deployment file. The remote display device 111 is configured to receive the deployment file containing the local channel, extract the contents and then display the local channel and any other channels according to the schedules for the local channel and the schedules for the other channels. In case of schedule conflicts between the local channel and the other channels, priority information associated with the channels may be used to resolve the conflict.

In this manner, the creation and deployment of the digital signage is completely automated from the perspective of the remote display devices 111. The remote display devices 111 simply receive the deployment files and display the channels according to the schedules.

Figure 2:
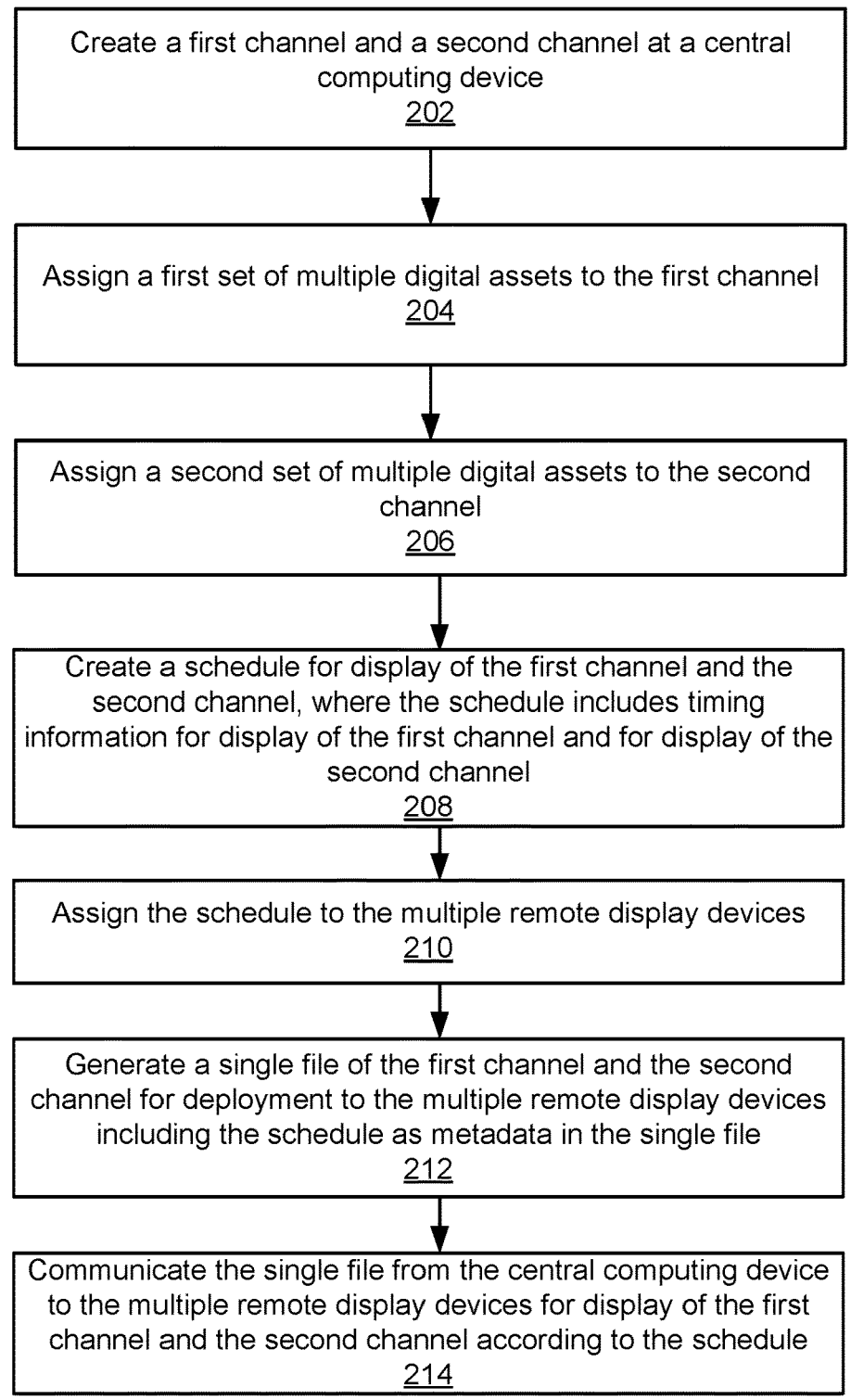
FIG. 2 is a flowchart illustrating example operations of the central computing device from the system of FIG. 1.

FIG. 2 is a flowchart illustrating an example process 200 for the operations of the central computing device from the system of FIG. 1. Process 200 describes a computer-implemented method for creating reusable digital signage at a central computing device and deploying the reusable digital signage from the central computing device to multiple remote display devices. Process 200 describes an implementation of creating a first channel and a second channel for deployment to multiple remote display devices, although multiple other channels may be created in the same manner.

Process 200 includes creating a first channel and a second channel at a central computing device (202). For example, as discussed above with respect to FIG. 1, the application 108 and the creation module 112 are used to create a first channel and a second channel using the user interface 114. The user interface 114 can be used to name the first channel and the second channel. The creation of the first channel and the second channel creates entries in the channel table 134.

Process 200 includes assigning a first set of multiple digital assets to the first channel (204) and assigning a second set of multiple digital assets to the second channel (206). For example, the creation module 112 and the user interface 114 are used to assign the first set of multiple digital assets to the first channel and to assign the second set of multiple digital assets to the second channel. The digital assets for the first channel and the digital assets for the second channel may come from the digital assets 132 in the digital signage database 130. The user interface 114 may be used to select the digital assets and to assign them to the channels, for example, using drag and drop operations or select, copy and paste operations or other operations. When the digital assets 132 are assigned to a specific channel, then entries are created in the channel table 134.

In some implementations, the first channel may include an ordered sequence for display of the first set of multiple digital assets. Likewise, the second channel may include an ordered sequence for display of the second set of multiple digital assets. In this manner, the user, through the user interface 114, may control the order in which the digital assets are displayed for each channel on the remote display devices. In some implementations, the user interface 114 may enable a random order for display of the digital assets in the first channel and in the second channel.

Process 200 includes creating a schedule for display of the first channel and the second channel, where the schedule includes timing information for display of the first channel and for display of the second channel (208). For example, the creation module 112 and the user interface 114 are used to create a schedule for the display of the first channel and the second channel. As discussed above, the schedule includes timing information for the display of the first channel and for the display of the second channel. In some implementations, the timing information may include days of the week and time periods for display of the first channel and for display of the second channel.

Process 200 includes assigning the schedule to the multiple remote display devices (210). For example, the creation module 112 and the user interface 114 are used to assign the schedule to the multiple remote display devices 111. The schedule of the first channel and the second channel can be applied to one or more remote display devices. In this manner, the digital asset assignments are made just one time to the channel and then the schedule for the channel is assigned to each display device just one time. This eliminates the need to tag and assign each digital asset to each display device.

The user interface 114 may include a listing of potential remote display devices that is populated from the display device table 136. The user interface 114 may use this listing from the display device table 136 to assign the schedule. When the schedule is assigned to the multiple remote display devices, appropriate entries are created in the mapping table 138 to track the schedules assigned to the various remote display devices. In some implementations, the creation module 112 may generate a color coded timeline of the schedule for display on the user interface 114, as illustrated below in more detail with respect to FIGS. 5 and 6.

Process 200 includes generating a single file of the first channel and the second channel for deployment to the multiple remote display devices including the schedule as metadata in the single file (212). For example, the deployment module 120 is configured to generate a single file of the first channel and the second channel for deployment to the multiple remote display devices 111 including the schedule 118 as metadata in the single file. The single file may also be referred to as a deployment file 140.

Process 200 also includes communicating the single file from the central computing device to the multiple remote display devices for display of the first channel and the second channel according to the schedule (214). For example, the deployment module 120 may communicate the deployment file 140 from the computing device 102 to the multiple remote display devices 111 for display of the first channel and the second channel according to the schedule 118.

The schedule that was created as part of the process 200 may be assigned by the creation module 112 through the user interface 114 to new (or different) remote display devices 111 that were not part of the original assignment of the schedule. The deployment module 120 may then communicate the deployment file that was created in step 212 from the computing device 102 to the new remote display devices 111 for display of the first channel and the second channel according to the schedule.

In some implementations, process 200 further includes (not shown) creating a third channel, assigning a third set of multiple digital assets to the third channel, creating a new schedule for display of the third channel, where the new schedule includes timing information for display of the third channel and assigning the new schedule to a portion of the multiple remote display devices. For example, a third channel may be created to display local or regional assets for display on only a subset of the remote display devices that are scheduled already to display the first channel and the second channel. The third channel with the local assignments may be created and populated with digital assets in the same manner as the first channel and the second channel.

Then, the deployment module 120 may generate a new single file of the third channel for deployment to the portion of the multiple remote display devices 111 including the new schedule as metadata in the new single file. The deployment module 120 may communicate the new single file from the computing device 102 to the portion of the multiple remote display devices 111 for display of the third channel along with the display of the first channel and the second channel according to the schedule and the new schedule. In some implementations, the deployment module 120 may communicate the new single file from the computing device 102 to the portion of the multiple remote display devices 111 in response to a ping for new files from at least one of the portions of the multiple remote display devices 111. In this manner, the new single file is not sent to all of the remote display devices, but is sent only to the remote display devices that are assigned to display the third channel.

In some implementations, the schedule and the new schedule may include priority information that overrides the timing information for display of the first channel and the second channel when timing information for the third channel conflicts with the timing information for the first channel and the second channel.

FIG. 3 is a flowchart illustrating an example process 300 for example operations of one remote display device from the system of FIG. 1. Process 300 describes a computer-implemented method for receiving and displaying reusable digital signage at a remote display device. For instance, the process 300 may be implemented by one of the remote display devices 111 of FIG. 1.

Process 300 includes receiving a single file at a remote display device from a central computing device, where the single file includes a first channel and a second channel and a schedule (302). For example, one of the remote display devices 111 of FIG. 1 is configured to receive a deployment file 140 from the deployment module 120, which is a component of the application 108 running on the computing device 102. The deployment file 140 may include multiple channels 116, including a first channel and a second channel along with a schedule 118 for displaying the first channel and the second channel on the remote display device 118.

Process 300 includes extracting from the single file the first channel containing a first set of multiple digital assets, the second channel containing a second set of multiple digital assets and the schedule, where the schedule includes timing information for display of the first channel and for display of the second channel (304). For example, the remote display device 111 is configured to extract the first channel and the second channel from the deployment file 140. The first channel includes the first set of digital assets assigned to the first channel by the creation module 112 and the second channel includes the second set of digital assets assigned to the second channel by the creation module 112. The schedule 118 includes timing information for when the remote display device 111 should display the first channel and the second channel. In some implementations, the timing information includes days of the week and time periods for display of the first channel and for display of the second channel.

In some implementations, the deployment file 140 may be in a compressed format. Part of the extraction of the deployment file 140 by the remote display device 111 includes un-compressing the compressed file and extracting the channel information, digital assets assigned to the channels and the schedule so that the information in the deployment file 140 is ready for display on the remote display device 111.

Process 300 includes displaying the first channel and the second channel on the remote display device according to the schedule (306). For example, the remote display device 111 is configured to display the first channel and the second channel according to the schedule 118. In some implementations, the first channel includes an ordered sequence for display of the first set of multiple digital assets and the second channel includes an ordered sequence for display of the second set of multiple digital assets. In this manner, the remote display device 111 can simply receive the deployment file 140, extract its contents and begin to display the channels according to the schedule that accompanied the file without any manual involvement.

In some implementations, the remote display device 111 may also be designated to play a local channel that may override a part of the schedule for the first channel and/or the second channel. For example, process 300 may further include (not shown) receiving a new single file at the remote display device from the central computing device, where the new single file includes a third channel and a new schedule, extracting from the new single file the third channel containing a third set of multiple digital assets and the new schedule, where the new schedule includes timing information for display of the third channel and displaying the first channel, the second channel and the third channel on the remote display according to the schedule and the new schedule. For example, the remote display device 111 may receive the new deployment file 140 from the computing device 102, where the new deployment file includes the third channel, which may be a local or regional channel, that contains a third set of multiple digital assets and a new schedule. The remote display device 111 is configured to display the third channel along with the first channel and the second channel according to the schedule and the new schedule.

In some implementations, the schedule and the new schedule further include priority information that overrides the timing information for display of the first channel and the second channel when timing information for the third channel conflicts with the timing information for the first channel and the second channel.

In some implementations, the remote display device 111 is configured to send a ping or query from the remote display device to the computing device 102 to check for new files. Any new files available for download and receipt would be done so by the remote display device 111 in response to the ping and an affirmative response to the ping.

Figure 4:
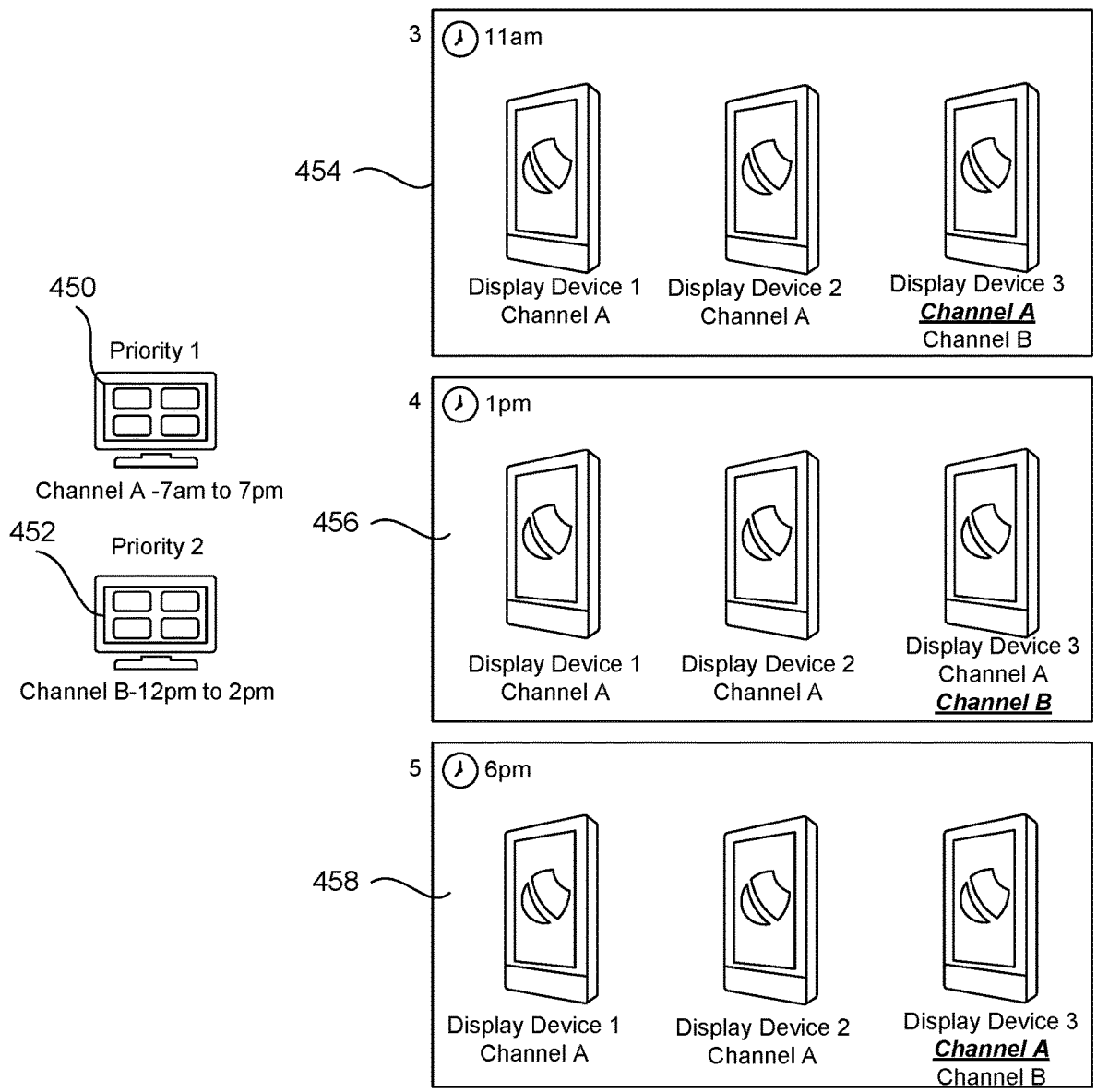
FIG. 4 is an example illustration that illustrates two different channels and three different remote display devices.

Referring to FIG. 4, an example illustration 400 illustrates two different channels and three different remote display devices. In illustration 400, channel A 450 is created with multiple digital assets and a schedule to run on designated remote display devices during the time period of 7 am to 7 pm with a priority of 1. Channel B 452 is created is multiple digital assets and a schedule to run on designated remote display devices from 12 pm to 2 pm with a priority of 2. In this example priority schema, the priority of 2 is a higher priority than a priority of 1 and therefore Channel B 452 would take priority over Channel A 450 during any time conflicts.

FIG. 4 also illustrates that Channel A 450 has been assigned to all three remote display devices and that Channel B 452 has been assigned only to remote display device 3. In this example, Channel A 450 may be considered a global experience because it's being displayed on all the device or at least a majority of the devices. Channel B 452 may be considered a local experience that should override the content of Channel A 450 during a subset of the day.

There are 3 time periods in the illustration 400. During the first time period 454 at 11 am, Channel A 450 is being displayed on all three display devices according to the schedule for Channel A. During the second time period 456 at 1 pm, Channel A is being displayed on display devices 1 and 2, but Channel B is being displayed on display device 3. That is, Channel A continues running on display devices 1 and 2, but Channel B overrides Channel A on display device 3 due to the higher priority. During the third time period 458, Channel A is once again being displayed on all three display devices.

As depicted in the illustration 400, each display device just receives the channels that are assigned to it and not each individual digital asset. So, assuming 4 digital assets in each channel, there are only a total of 4 assignments that need to be made in the creation module 112 and the user interface 114, namely one assignment for display device 1, one assignment for display device 2 and two assignments for display device 3, instead of 16 assignments were each asset to be assigned separately to each display device.

Referring to FIG. 5, an example screenshot 500 illustrates a timeline on the user interface for a single day. For instance, this screenshot 500 may be displayed on the user interface 114. In the example screenshot 500, four Channels A-D and their schedules and priority information are listed in a schedule box 560. There are 3 display devices 1-3 listed in the devices box 570. All four Channels A-D have been assigned to each of the 3 display devices 1-3. Channels A and B are more global experiences that have a yearly schedule and a priority of 1 and Channels C and D are special events schedules that only play on certain days of the year during certain time periods with a priority of 2. Thus, during those special events schedule time periods, Channels C and D will override and be displayed instead of Channels A or B.

A color coded (showing shades in this example) timeline 580 provides a snapshot to the user of the display schedule for the day of Jan. 30, 2017. During this time period, Channels C and D are scheduled for display with Channel C being displayed from 6 am to 12 pm and Channel D being displayed from 12 pm to 6 pm on all three display devices 1-3.

Figure 6:
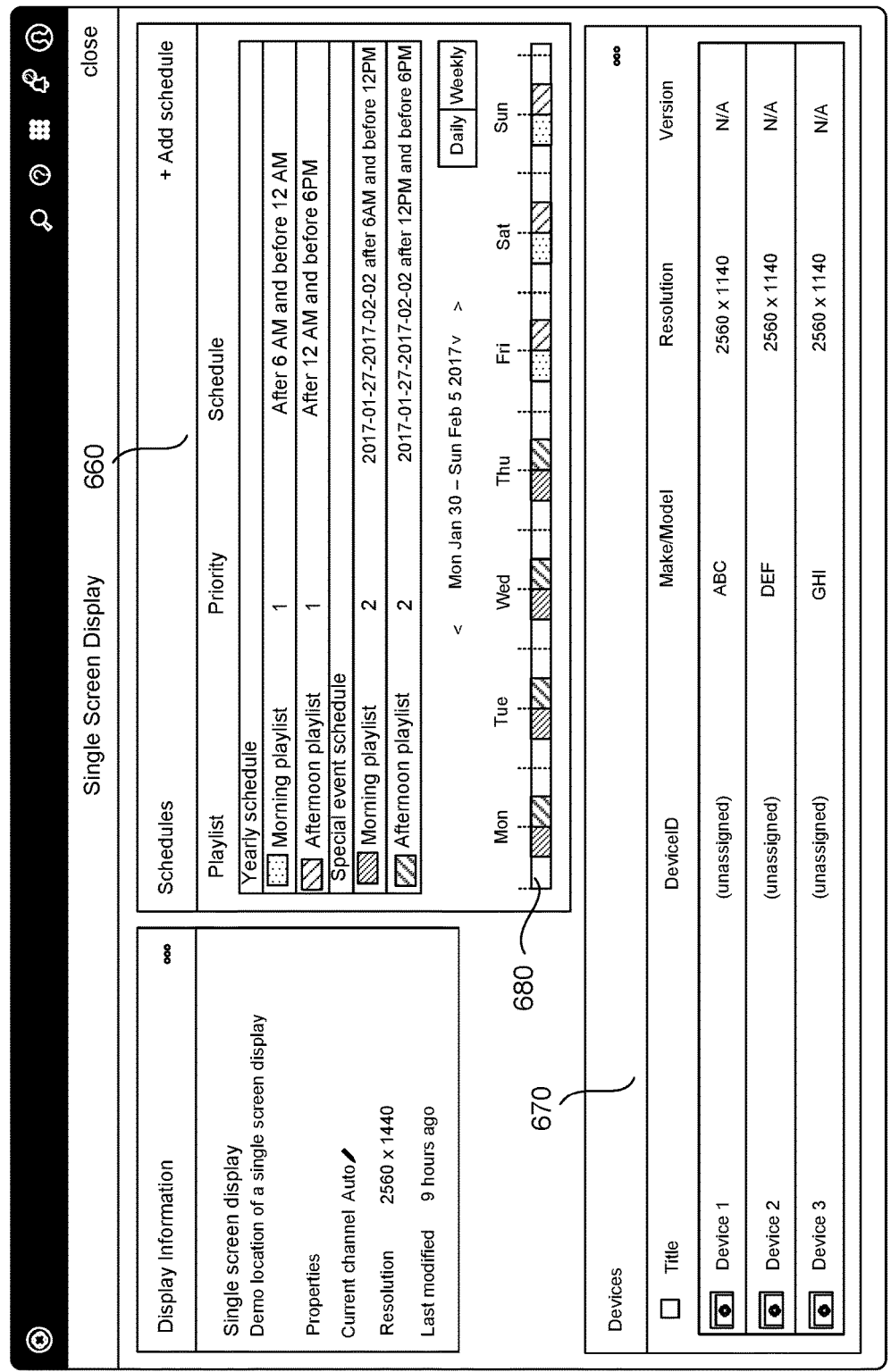
FIG. 6 is an example screenshot of timeline on the user interface for a week.

Referring to FIG. 6, an example screenshot 600 illustrates a timeline on the user interface for a week. Similarly to FIG. 5, the screenshot 600 illustrates the same four Channels A-D and their schedules and priority information are listed in a schedule box 660. There are 3 display devices 1-3 listed in the devices box 670. All four Channels A-D have been assigned to each of the 3 display devices 1-3. Channels A and B are more global experiences that have a yearly schedule and a priority of 1 and Channels C and D are special events schedules that only play on certain days of the year during certain time periods with a priority of 2. Thus, during those special events schedule time periods, Channels C and D will override and be displayed instead of Channels A or B.

A color coded (showing shades in this example) timeline 680 provides a snapshot to the user of the display schedule for the week of Jan. 30, 2017-Feb. 5, 2017. During this time period, Channels C and D are scheduled for display on Monday through Thursday with Channel C being displayed from 6 am to 12 pm and Channel D being displayed from 12 pm to 6 pm on all three display devices 1-3. Channels A and B are scheduled for display on Friday through Sunday with Channel A being displayed from 6 am to 12 pm and Channel B being displayed from 12 pm to 6 pm on all three display devices 1-3.

Figure 7:
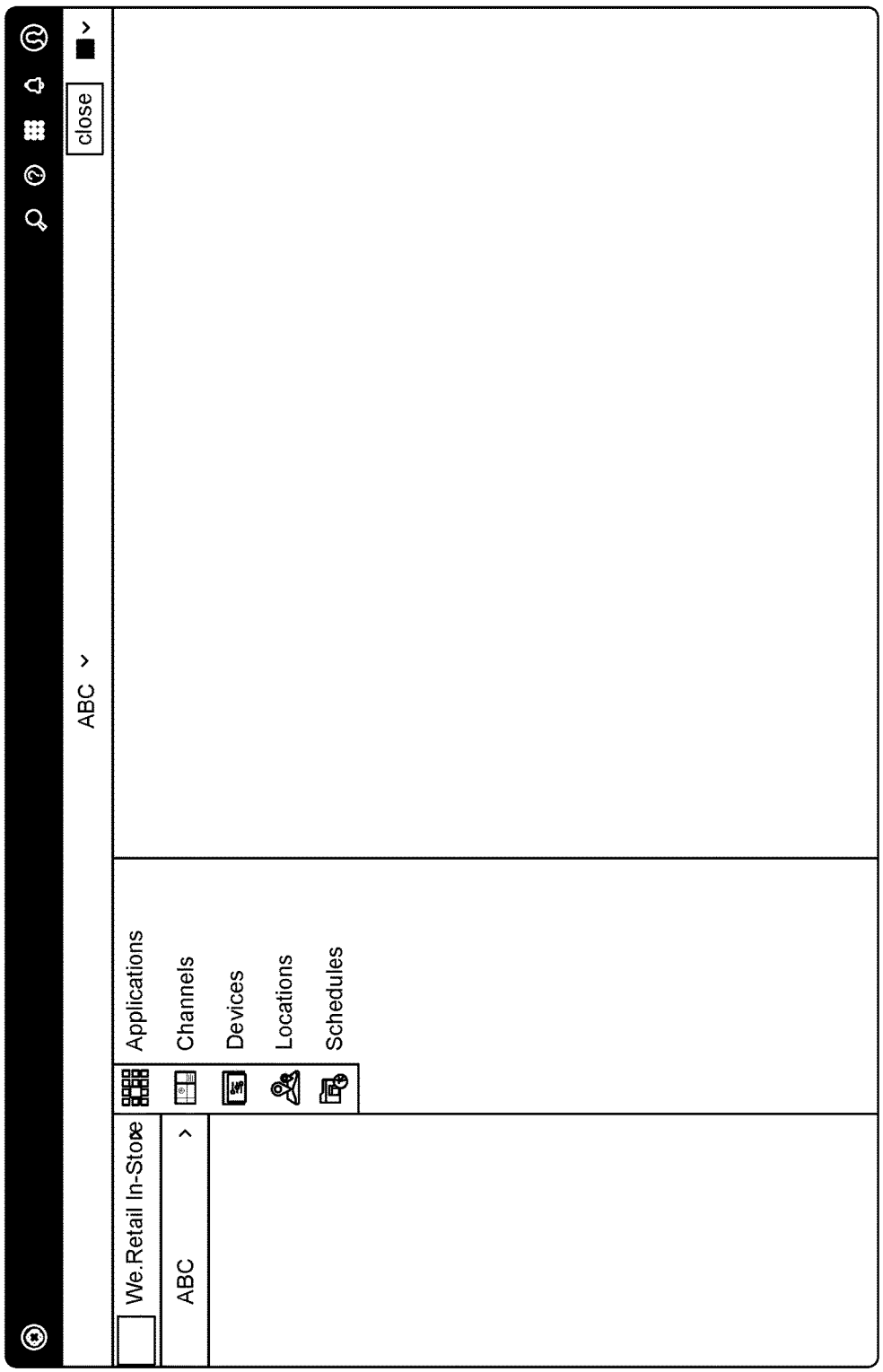
FIG. 7 is an example screen shot of the user interface from the system of FIG. 1.

Referring to FIGS. 7-18, example screen shots illustrate the an example user interface, such as user interface 114 of FIG. 1. FIG. 7 illustrates a screenshot 700 of the user interface as a new project is being created for reusable digital signage to be displayed on remote display devices, for example, in different automobile showrooms in different locations.

Figure 8:
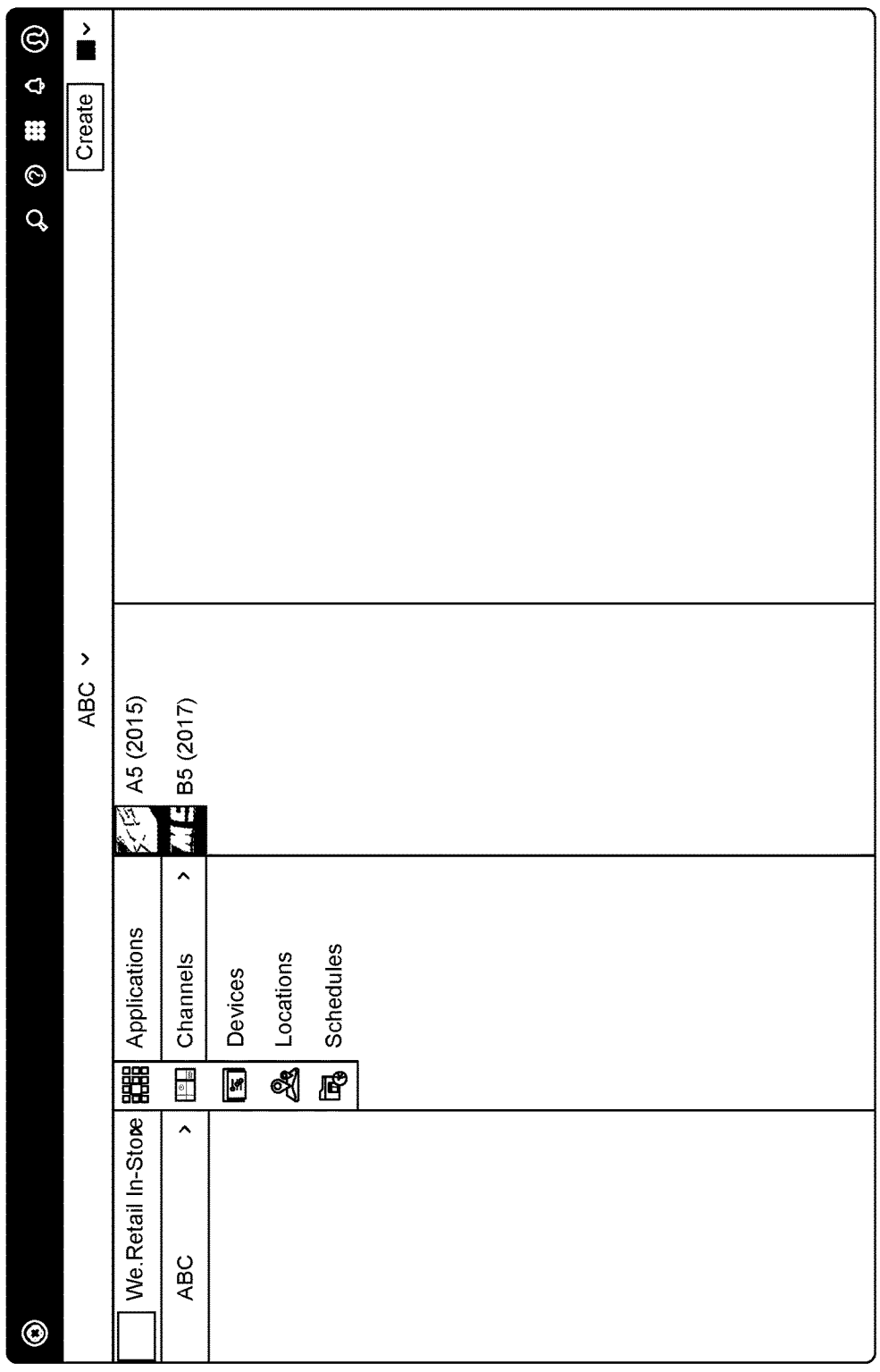
FIG. 8 is an example screen shot of the user interface from the system of FIG. 1.

FIG. 8 illustrates a screenshot 800 of the user interface being used to create two global channels. One channel is called "A5" and the other channel is called "B5". These are two different channels that will be used to display slideshows and other digital assets on display devices in different automobile showrooms to show information about these two car models.

Figure 9:
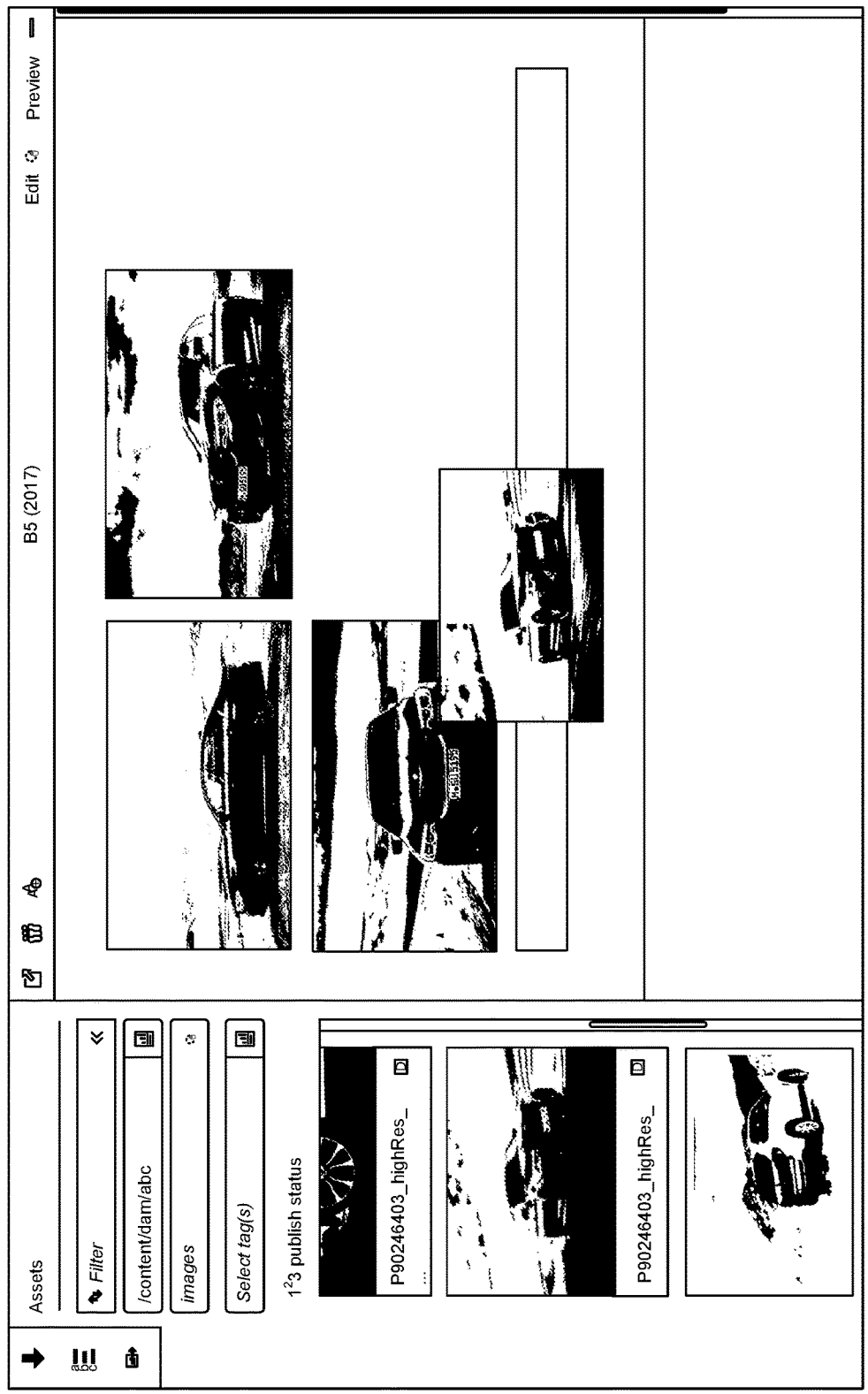
FIG. 9 is an example screen shot of the user interface from the system of FIG. 1.
Figure 10:
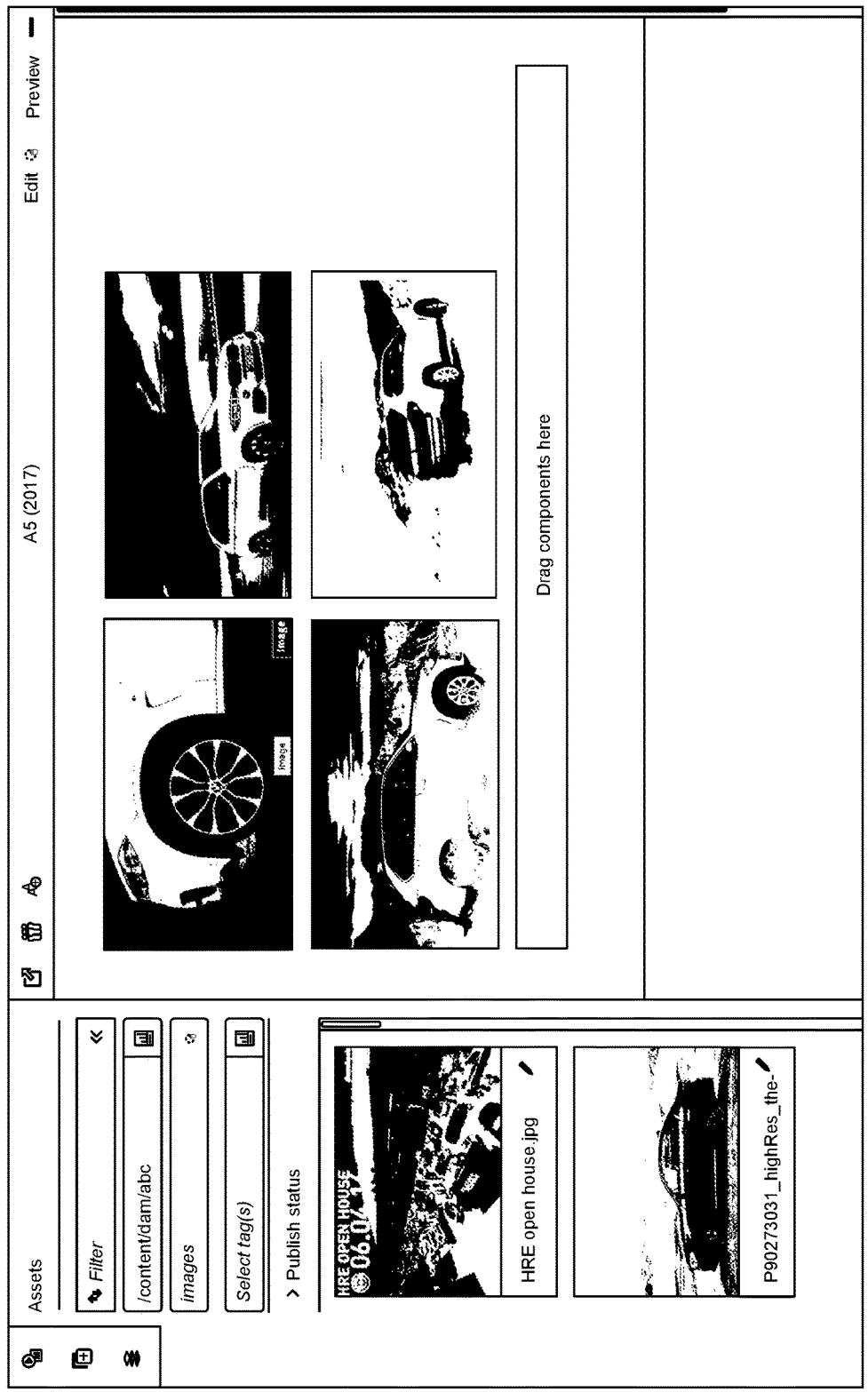
FIG. 10 is an example screen shot of the user interface from the system of FIG. 1.

FIG. 9 illustrates a screenshot 900 of the user interface being used to select and drag digital assets (e.g., images) to the B5 channel. FIG. 10 illustrates a screenshot 1000 of the user interface being used to select and drag different digital assets to the A5 channel.

Figure 11:
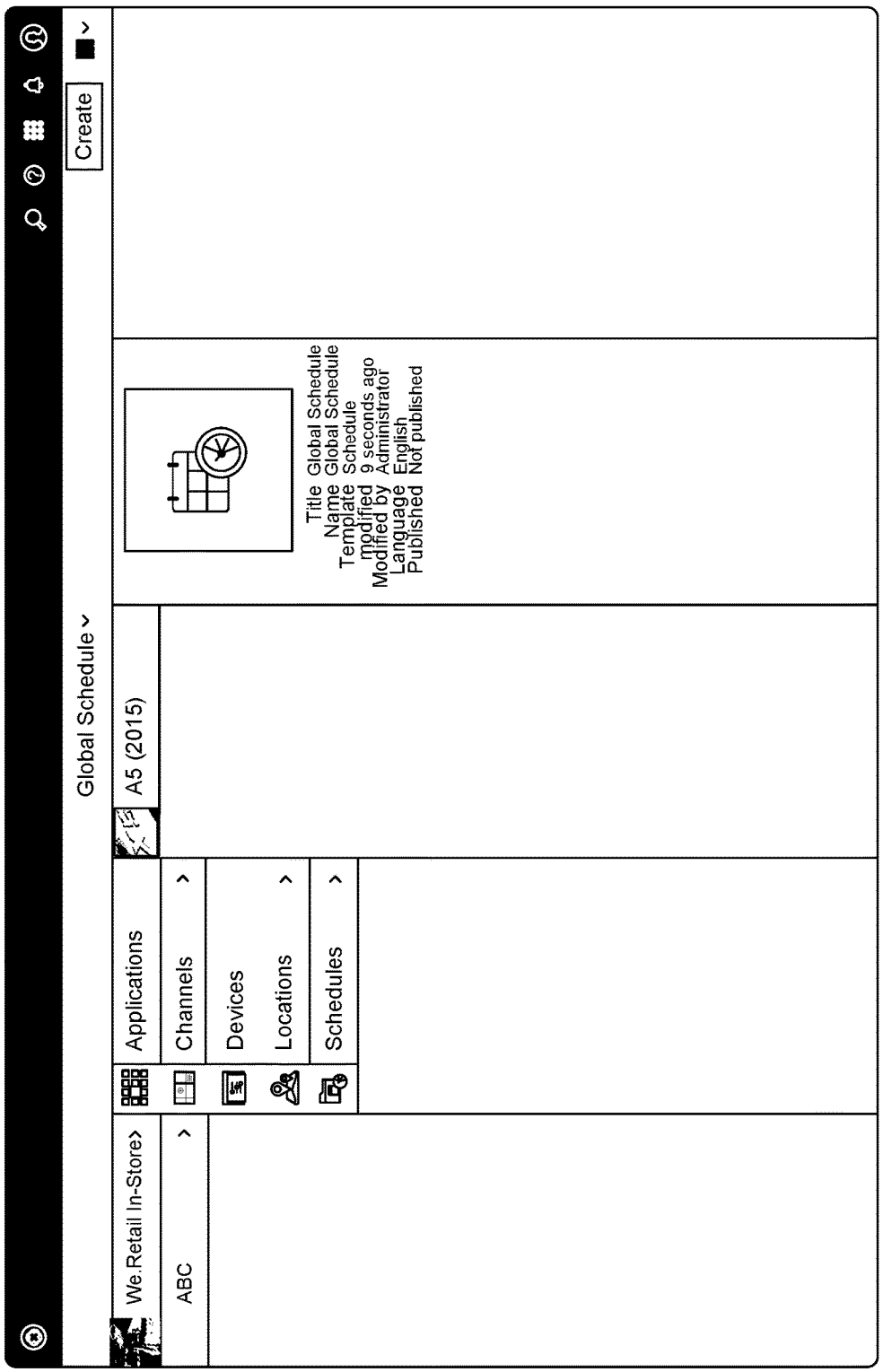
FIG. 11 is an example screen shot of the user interface from the system of FIG. 1.

FIG. 11 illustrates a screenshot 1100 of the user interface being used to create a schedule for each of the two channels. The schedule in this example has been titled "Global Schedule" and forms a re-usable experience to be deployed as a deployment file to various remote display devices located in different automobile showrooms. FIG. 12 illustrates a screenshot 1200 of the user interface being used to add timing information to the Global Schedule. In this example, the B5 channel will be displayed before 12:00 pm and the A5 channel will be displayed after 12:00 pm. Each has a priority of 1. If later another channel is added that has a higher priority and overlaps one of the channels, then the new channel would take priority and override the channel and be displayed according to its schedule.

Figure 13:
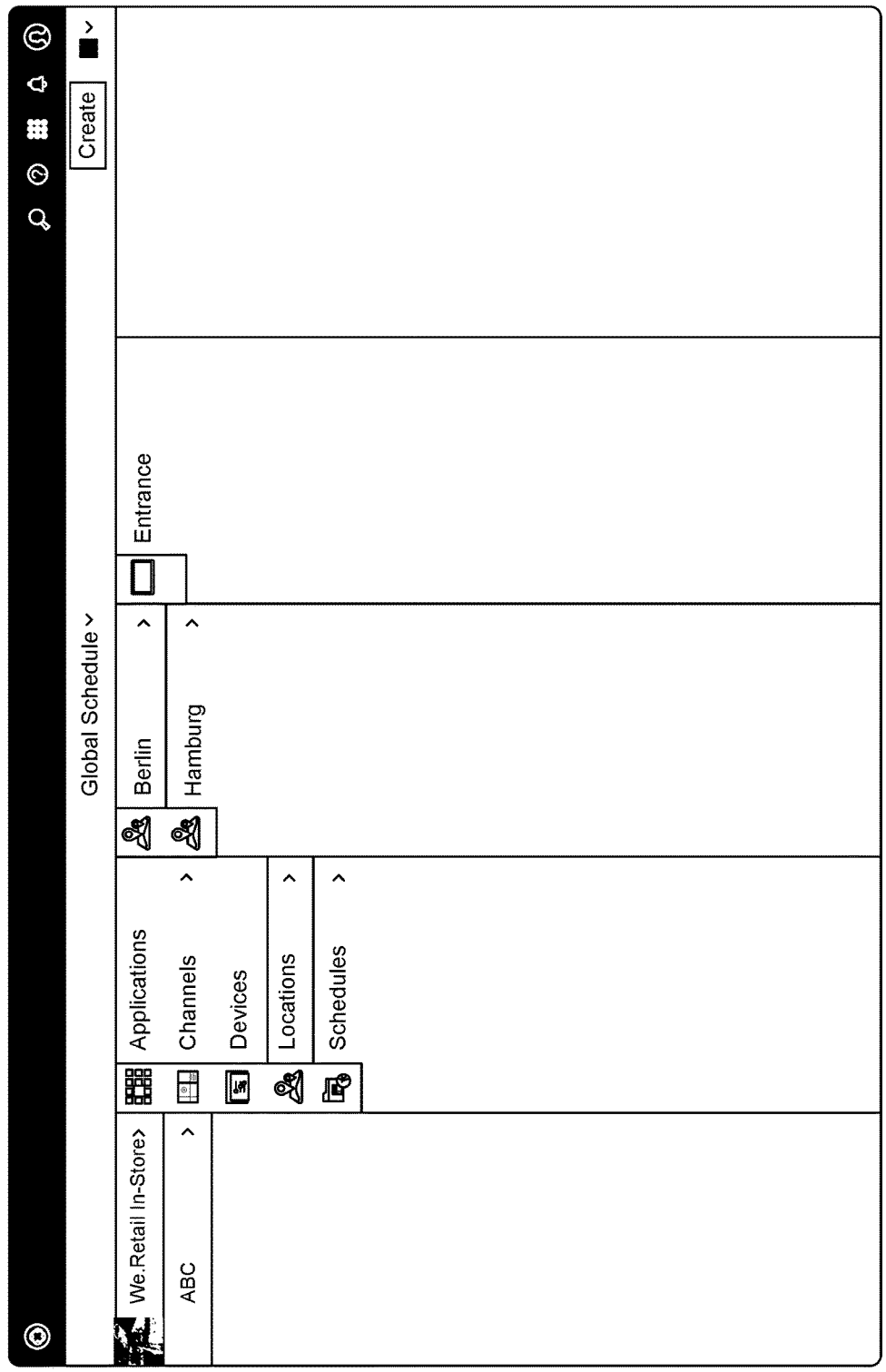
FIG. 13 is an example screen shot of the user interface from the system of FIG. 1.

FIG. 13 illustrates a screenshot 1300 of the user interface displaying the locations of the display devices. The locations are in Berlin and Hamburg and the display devices are the Entrance display devices. FIG. 14 illustrates a screenshot 1400 of the user interface assigning the Global Schedule of the two channels to each Entrance display. FIG. 15 illustrates a screenshot 1500 of the user interface that shows the schedule now also lists the two Entrance display devices that the channels of the Global Schedule are being shown on.

Figure 16:
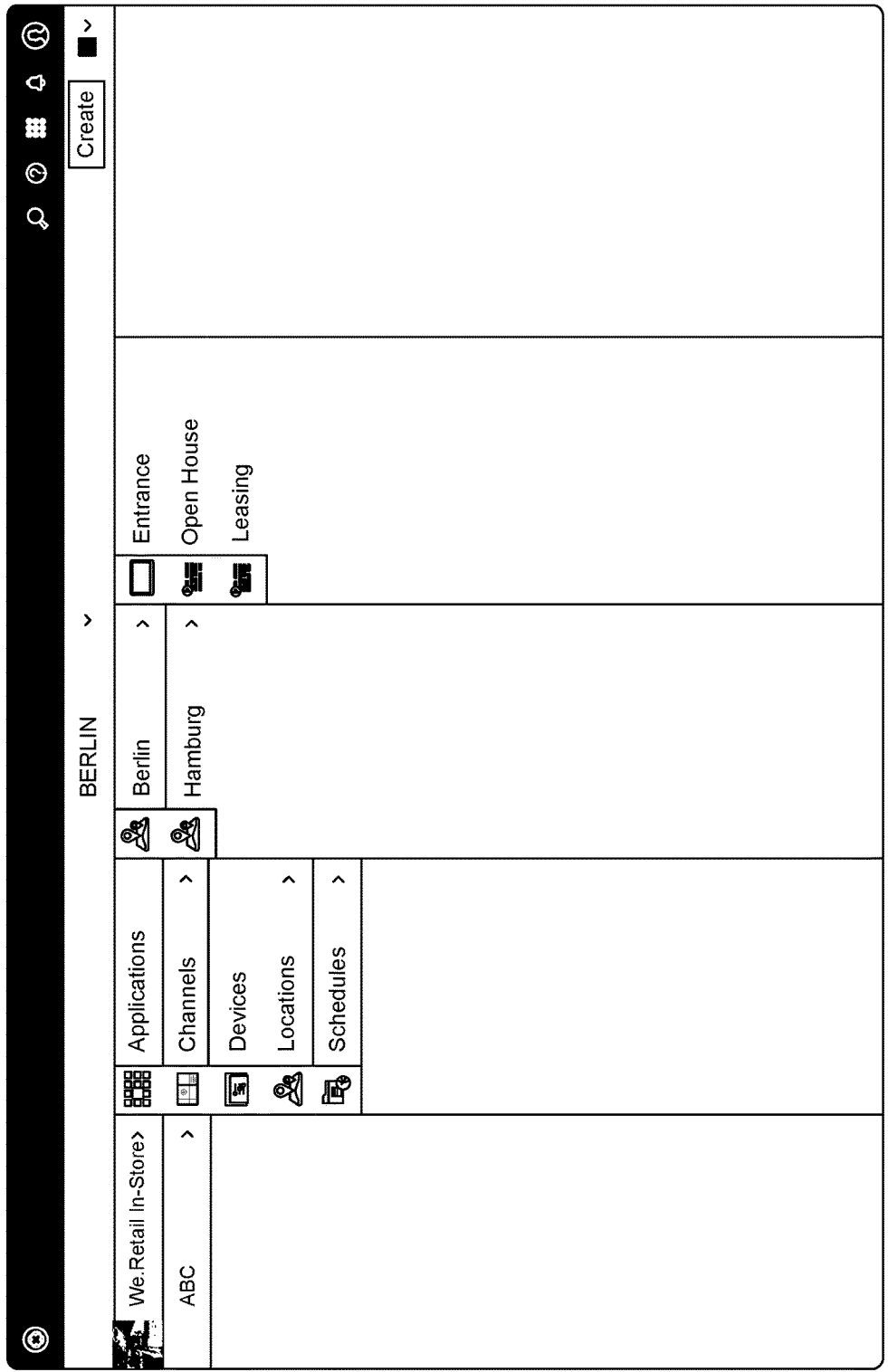
FIG. 16 is an example screen shot of the user interface from the system of FIG. 1.
Figure 17:
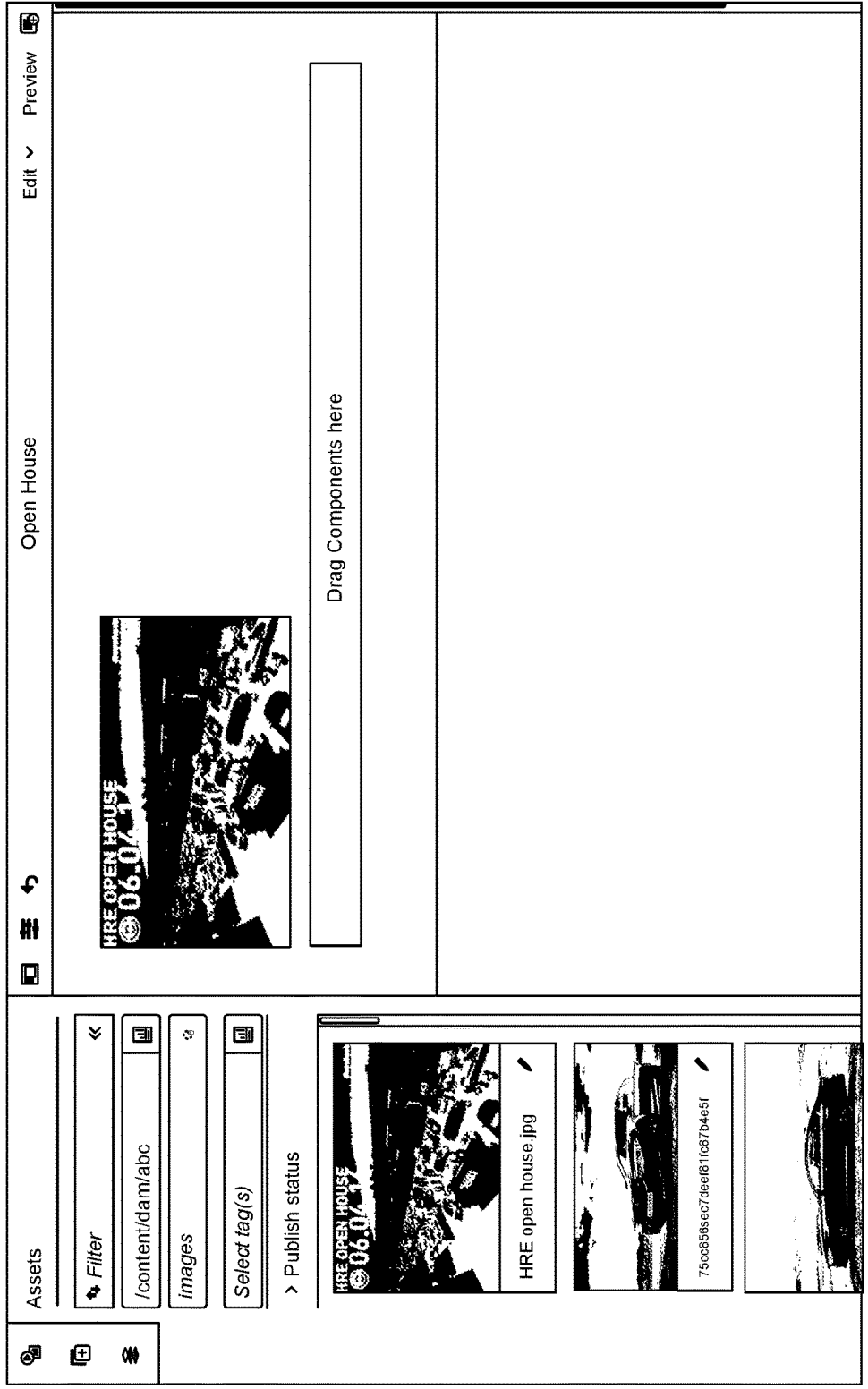
FIG. 17 is an example screen shot of the user interface from the system of FIG. 1.

FIG. 16 illustrates a screenshot 1600 of the user interface that shows two local channels, Open House and Leasing, being added to the Berlin location. FIG. 17 illustrates a screenshot 1700 of the user interface that shows digital assets being added to the Open House channel. Finally, FIG. 18 illustrates a screenshot 1800 of the user interface assigning the Open house Channel to the Entrance display device for Berlin. The schedule information for the Open House channel also is shown with timing information of after 11:00 am and before 2:00 pm and priority information of 2. Thus, during the hours of 11:00 am and 2:00 pm, the Open House channel will override the other channels because the Open House channel has a higher priority. The Open House channel only runs on the Entrance display in Berlin and not on the Entrance display in Hamburg.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for creating reusable digital signage at a central computing device and deploying the reusable digital signage from the central computing device to multiple remote display devices, the method comprising:
creating a first channel and a second channel at a central computing device;
assigning a first set of multiple digital assets to the first channel;
assigning a second set of multiple digital assets to the second channel;
assigning the first channel to the multiple remote display devices and assigning the second channel to a subset of the multiple remote display devices;
assigning first priority information to the first channel and assigning second priority information to the second channel, the first priority information and the second priority information defining a numerical ranking scheme for when second timing information for display of the second channel overrides first timing information for display of the first channel when the second timing information for the second channel conflicts with the first timing information for the first channel;
creating a schedule for display of the first channel and the second channel, wherein the schedule includes the first timing information for display of the first channel and the second timing information for display of the second channel, remote display device assignment information for display of the first channel and for display of the second channel, and the first priority information for the first channel and the second priority information for the second channel;
assigning the schedule to the multiple remote display devices;
generating a single file of the first channel and the second channel for deployment to the multiple remote display devices including the schedule as metadata in the single file; and
communicating the single file from the central computing device to the multiple remote display devices for display of the first channel and the second channel according to the schedule.

2. The method as in claim 1, wherein:
the first channel includes an ordered sequence for display of the first set of multiple digital assets; and
the second channel includes an ordered sequence for display of the second set of multiple digital assets.

3. The method as in claim 1, further comprising:
creating a third channel;
assigning a third set of multiple digital assets to the third channel;
creating a new schedule for display of the third channel, wherein the new schedule includes third timing information for display of the third channel;
assigning the new schedule to a portion of the multiple remote display devices;
generating a new single file of the third channel for deployment to the portion of the multiple remote display devices including the new schedule as metadata in the new single file; and
communicating the new single file from the central computing device to the portion of the multiple remote display devices for display of the third channel along with the display of the first channel and the second channel according to the schedule and the new schedule.

4. The method as in claim 3, wherein the new schedule further includes third priority information that overrides the first timing information for display of the first channel and the second timing information for display of the second channel when the third timing information for the third channel conflicts with the first timing information for the first channel and the second timing information for the second channel.

5. The method as in claim 3, wherein communicating the new single file comprises communicating the new single file from the central computing device to the portion of the multiple remote display devices in response to a ping for new files from at least one of the portion of the multiple remote display devices.

6. The method as in claim 1, further comprising:
generating a color coded timeline of the schedule; and
displaying the color coded timeline on a user interface.

7. The method as in claim 1, wherein the first timing information includes days of the week and time periods for display of the first channel and the second timing information includes days of the week and time periods for display of the second channel.

8. The method as in claim 1, further comprising:
assigning the schedule to a new remote display device; and
communicating the single file from the central computing device to the new remote display device for display of the first channel and the second channel according to the schedule.

9. A computer-implemented method for receiving and displaying reusable digital signage at a remote display device, the method comprising:
receiving a single file at a remote display device from a central computing device, wherein the single file includes a first channel and a second channel and a schedule;
extracting from the single file the first channel containing a first set of multiple digital assets, the second channel containing a second set of multiple digital assets, and the schedule, wherein the schedule includes first timing information for display of the first channel and second timing information for display of the second channel, remote display device assignment information for display of the first channel and for display of the second channel, and first priority information and second priority information, the first priority information and the second priority information defining a numerical ranking scheme for when the second timing information for display of the second channel overrides the first timing information for display of the first channel when the second timing information for the second channel conflicts with the first timing information for the first channel; and
displaying the first channel and the second channel on the remote display device according to the schedule.

10. The method as in claim 9, wherein:
the first channel includes an ordered sequence for display of the first set of multiple digital assets; and
the second channel includes an ordered sequence for display of the second set of multiple digital assets.

11. The method as in claim 9, further comprising:
receiving a new single file at the remote display device from the central computing device, wherein the new single file includes a third channel and a new schedule;
extracting from the new single file the third channel containing a third set of multiple digital assets and the new schedule, wherein the new schedule includes third timing information for display of the third channel; and
displaying the first channel, the second channel and the third channel on the remote display according to the schedule and the new schedule.

12. The method as in claim 11, wherein the new schedule further includes third priority information that overrides the first timing information for display of the first channel and the second timing information for display of the second channel when the third timing information for the third channel conflicts with the first timing information for the first channel and the second timing information for the second channel.

13. The method as in claim 11, further comprising:
sending a ping from the remote display device to the central computing device to check for new files, wherein receiving the new single file comprises receiving the new single file in response to the ping.

14. The method as in claim 9, wherein the first timing information includes days of the week and time periods for display of the first channel and the second timing information includes days of the week and time periods for display of the second channel.

15. A system for creating reusable digital signage at a central computing device and deploying the reusable digital signage from the central computing device to multiple remote display devices, the system comprising:
at least one memory including instructions; and
at least one processor that is operably coupled to the at least one memory and that is arranged and configured to execute instructions that, when executed, cause the at least one processor to implement an application having a user interface, the application comprising:
a creation module that is configured to:
create a first channel and a second channel using the user interface,
assign a first set of multiple digital assets to the first channel using the user interface,
assign a second set of multiple digital assets to the second channel using the user interface,
assign the first channel to the multiple remote display devices and assign the second channel to a subset of the multiple remote display devices,
assign first priority information to the first channel and assign second priority information to the second channel, the first priority information and the second priority information defining a numerical ranking scheme for when second timing information for display of the second channel overrides first timing information for display of the first channel when the second timing information for the second channel conflicts with the first timing information for the first channel,
create a schedule using the user interface for display of the first channel and the second channel, wherein the schedule includes the first timing information for display of the first channel and the second timing information for display of the second channel, remote display device assignment information for display of the first channel and for display of the second channel, and the first priority information for the first channel and the second priority information for the second channel, and
assign the schedule using the user interface to the multiple remote display devices; and
a deployment module that is configured to:
generate a single file of the first channel and the second channel for deployment to the multiple remote display devices including the schedule as metadata in the single file, and
communicate the single file from the central computing device to the multiple remote display devices for display of the first channel and the second channel according to the schedule.

16. The system of claim 15, wherein:
the first channel includes an ordered sequence for display of the first set of multiple digital assets; and
the second channel includes an ordered sequence for display of the second set of multiple digital assets.

17. The system of claim 15, wherein:
the creation module is further configured to:
create a third channel using the user interface,
assign a third set of multiple digital assets to the third channel using the user interface,
create a new schedule using the user interface for display of the third channel, wherein the new schedule includes third timing information for display of the third channel, and
assign the new schedule using the user interface to a portion of the multiple remote display devices; and
the deployment module is further configured to:
generate a new single file of the third channel for deployment to the portion of the multiple remote display devices including the new schedule as metadata in the new single file; and
communicate the new single file from the central computing device to the portion of the multiple remote display devices for display of the third channel along with the display of the first channel and the second channel according to the schedule and the new schedule.

18. The system of claim 17, wherein the new schedule further includes third priority information that overrides the first timing information for display of the first channel and the second timing information for display of the second channel when the third timing information for the third channel conflicts with the first timing information for the first channel and the second timing information for the second channel.

19. The system of claim 15, wherein the creation module if further configured to:
generate a color-coded timeline of the schedule; and
display the color-coded timeline on the user interface.

20. The system of claim 15, wherein the deployment module is further configured to:
assign the schedule using the user interface to a new remote display device; and
communicate the single file from the central computing device to the new remote display device for display of the first channel and the second channel according to the schedule.

* * * * *